March 8, 1966  J. DEMETER  3,239,367
METHOD AND APPARATUS FOR PRODUCING PLASTIC COATED CARRIERS
Filed Feb. 27, 1963  5 Sheets-Sheet 1

INVENTOR.
JOZSEF DEMETER
BY
Irwin S. Thompson
ATTY.

March 8, 1966  J. DEMETER  3,239,367
METHOD AND APPARATUS FOR PRODUCING PLASTIC COATED CARRIERS
Filed Feb. 27, 1963  5 Sheets-Sheet 3

INVENTOR.
JOZSEF DEMETER
BY
Irvin S. Thompson
ATTY.

March 8, 1966 J. DEMETER 3,239,367
METHOD AND APPARATUS FOR PRODUCING PLASTIC COATED CARRIERS
Filed Feb. 27, 1963 5 Sheets-Sheet 4

INVENTOR.
JOZSEF DEMETER
BY
Irwin S. Thompson
ATTY.

March 8, 1966 J. DEMETER 3,239,367
METHOD AND APPARATUS FOR PRODUCING PLASTIC COATED CARRIERS
Filed Feb. 27, 1963 5 Sheets-Sheet 5
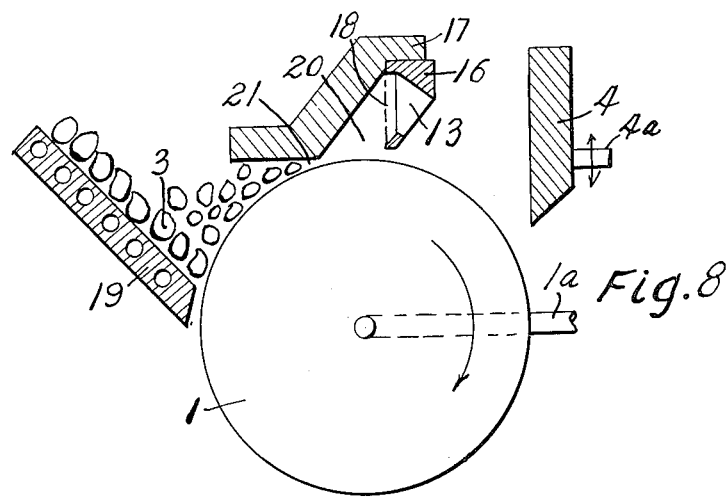
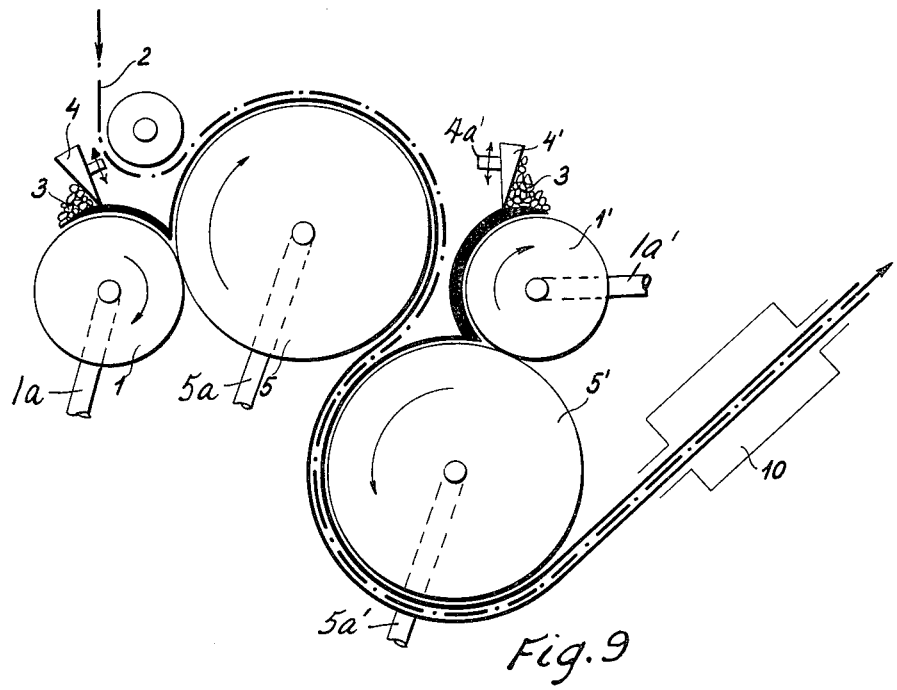
INVENTOR.
JOZSEF DEMETER
BY
Irwin S. Thompson
ATTY.

United States Patent Office 3,239,367
Patented Mar. 8, 1966

3,239,367
METHOD AND APPARATUS FOR PRODUCING
PLASTIC COATED CARRIERS
József Demeter, 3 Dozsa Gyorgy ut., Budapest, Hungary
Filed Feb. 27, 1963, Ser. No. 261,441
9 Claims. (Cl. 117—68)

This invention concerns improvements in or relating to the production of plastic coated carriers and more particularly to a process and apparatus for continuously coating or impregnating such carriers with layers of plastic material. In this specification the term "coating" includes impregnation.

Carrier webs or strips coated or impregnated with plastic layers are widely used. In some cases the quantity of the plastic applied to the carrier has to be controlled very closely, i.e. within narrow limits. For the manufacture of coated plastic articles it is, for example, necessary to keep within the internationally permissible tolerance of ±5% with carriers coated with thermosetting plastics, i.e. as regards the nominal value applied per unit area of the carrier, a maximum variation of ±5% is permissible. At the same time this also means, that the variation in thickness of the plastic layer applied to the carrier, can only amount to a maximum of ±5% of the nominal value. The thickness of the plastic layer is ordinarily between 0.01 and 0.1 mm., depending on its use. The variation in thickness thus amounts to between 0.0005 mm. and 0.005 mm. An application of plastic with such a degree of accuracy has hitherto only been possible with two known methods:

(a) The plastic was dissolved in a solvent and the lacquer obtained in this manner applied to the surface of the carrier;

(b) The plastic was melted, extruded through a slit-like nozzle to a thickness of 0.5–1.0 mm., then made thinner by stretching to the desired value and thereupon applied to the surface of the carrier.

The disadvantage of the first process lies in the large size of the apparatus and the high cost of the solvent; in the second process, the apparatus is very costly.

The characteristic feature of the process mentioned above under (b) consists in that from the melted plastic, first a layer which is considerably thicker than the thickness of the layer to be applied to the carrier, is produced by extruding it through a so-called wide slit nozzle which layer is made thinner by stretching it to the desired value, after which it is applied to the surface of the carrier. The stretching generally takes place in the atmosphere i.e., during the stretching the plastic is not in contact with any solid body, and is thus not supported. This process has several disadvantages. The extrusion through a wide slit nozzle requires a high pressure and thus a considerable use of power, an apparatus of great strength being thus required. On the other hand, filter elements have to be provided in the plant for homogenizing and filtering the plastic which elements have to be replaced from time to time, in which case operations have to be interrupted during such replacement. A further considerable disadvantage resides in the fact that with this process—in one operation—a coating of the carrier with plastic can only be carried out on one side, as a result of which the necessary impregnation—especially in the manufacture of laminates—is not always obtainable.

It is an object of this invention to provide a process and apparatus by means of which the above disadvantages are avoided or at least reduced and which enables a carrier to be coated or impregnated with a plastic on one or both sides more reliably and cheaply than by the above mentioned processes.

According to the invention there is provided a process for the continuous coating and/or impregnation of a carrier with plastic material in which plastic is fed continuously onto the surface of a heated rotating receiving roller to form a first layer of plastic on a part of said surface, which layer is then transferred to the surface of a coating roller which is axially parallel to and in contact with said receiving roller and which is rotating at a higher speed than said receiving roller, the ratio of the speeds of said receiving and coating rollers being such that on part of the surface of said coating roller a second layer of plastic is formed of a thickness less than that of said first mentioned layer, which second layer is transferred to a carrier moving in contact with said coating roller, after which the carrier and the plastic layer applied thereto are heat treated and finally cooled.

In a modification of the process, the plastic is fed to a gap produced between two parallel rotating receiving rollers, such gap having a width equal to twice the thickness of the said first layer of plastic, and the resulting two thicker layers being each transferred to a separate coating roller which rollers engage respectively with the two receiving rollers and rotate at a higher peripheral speed, from which coating rollers the layer forming thereon with a final thickness is transferred to one side of a common carrier by coating or impregnation or a combination of these processes. If desired the said layers formed on the said coating rollers can be transferred by coating or impregnation to opposite sides of the carrier, by suitably arranging the path of movement of the carrier wtih respect to the rollers.

When carrying out the process with an apparatus according to the invention having one pair of rollers, these will be a receiving roller and a coating roller which are controllably heatable and extend parallel to and engage with one another. The rollers will moreover have the same direction of rotation but different and adjustable peripheral speeds, and a doctor blade will be provided for the adjustment of the thickness of the molten plastic layer forming on the coating roller.

When using two pairs of rollers, the apparatus according to the invention comprises two pairs of self-cleaning rollers, each consisting of a receiving and a coating roller, the surfaces of the two receiving rollers forming an adjustable slit which will correspond to the thickness of the above-mentioned thicker and first plastic layer.

Figure 6:
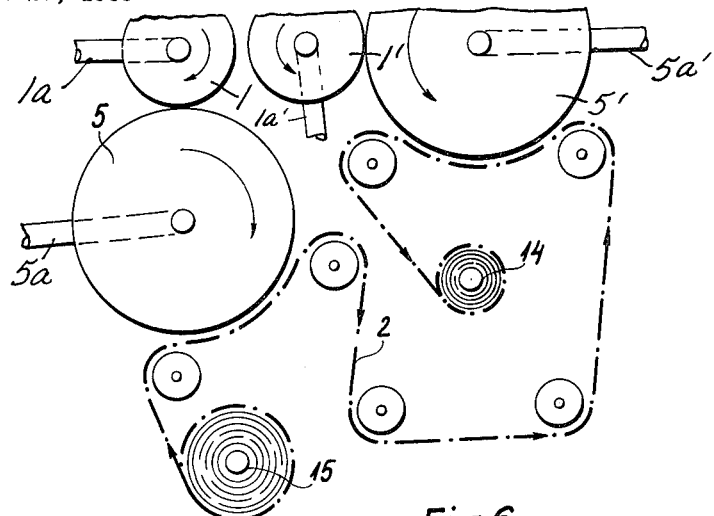
Figure 7:
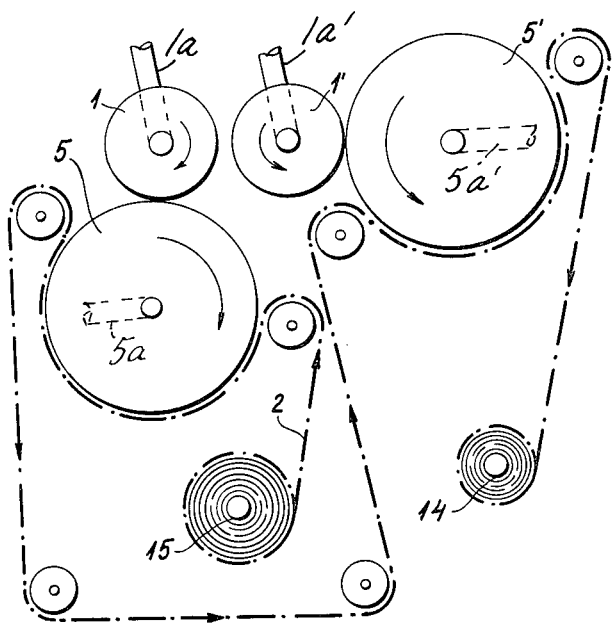

Other embodiments including various other ways of guiding the carrier are shown in FIGS. 6 and 7.

In the embodiment of FIG. 8, the apparatus is provided with a filter device to remove impurities from the plastic.

FIG. 9 shows a further variation in which no guide rollers are used.

The process will be described first in connection with the simplest embodiment diagrammatically illustrated in FIG. 1. The axial length of a heated roller 1 heated by hot fluid in a conduit 1a is made greater than the width of a carrier 2 to be coated and the direction of rotation of roller 1 is indicated by an arrow. A heated blade 4 has the same length as the roller and the radial spacing thereof from the surface of the roller is adjustable by adjustment means means 4a. Plastic material 3, for example, as in U.S. Patent No. 2,736,718, February 28, 1956, and the references cited therein, at room temperature, is fed onto the surface of the roller, over an axial length corresponding to the width of the carrier. The plastic is melted by the heat of the roller, adheres thereto and moves, in a layer $v_1$ the thickness of which depends on the setting of the blade 4, together with the peripheral speed $c_1$. Due to the rotation of the roller 1, the plastic layer of a thickness $v_1$ comes into contact with the carrier 2 which moves at an adjustabel speed $c_2$, and is spread thereon. The plastic layer of a thickness $v_2$ forming on the carrier will have a thickness of $v_2 = v_1 c_1 / c_2$.

In the interest of the internationally required accuracy of the coating, it has to be ensured that the variation of the thickness $v_1$ of the plastic layer produced on the surface of the roller 1 remains within the limit of $\pm 5\%$. By choosing the speed $c_2$ of the carrier correspondingly higher than the speed $c_1$, $v_1$ can be, for example, maintained constant at 1 mm. independently of the thickness $v_2$ of the coating on the carrier 2. In this case, keeping to the tolerance of $\pm 5\%$ means that the surface of the roller 1 and the edge of the blade 4 have to be accurate within $\pm 0.05$ mm. This can be maintained in practice.

Figure 1:
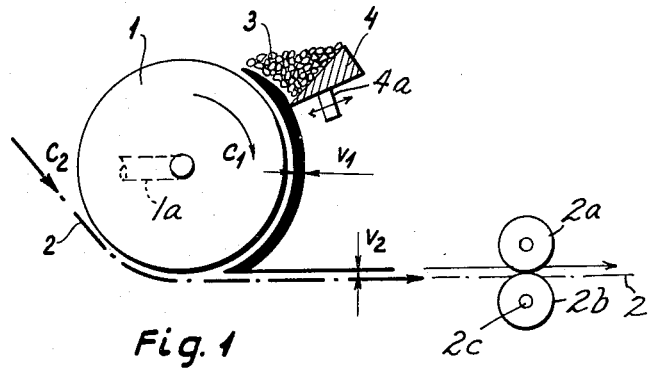
FIG. 1 illustrates apparatus embodying the simplest principle of the invention.
Figure 2:
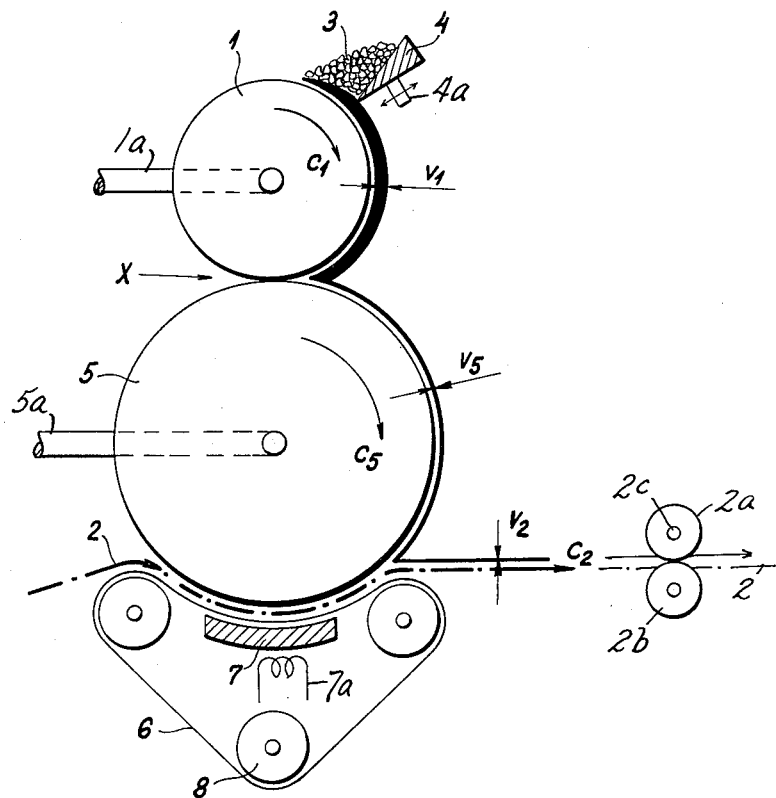
FIG. 2 shows a first practical embodiment.

Conventional means are used for moving the carrier 2 in FIGS. 1 and 2, in the form of opposed pinch rolls $2a$ and $2b$ at least one of which has a driven shaft $2c$, these rolls being spaced from the coating roller a distance sufficient to permit the coating to harden thereby to avoid damage to the coating from rolls $2a$ and $2b$.

A disadvantage of the arrangement of FIGURE 1 as described above resides in the fact that the carrier does not completely take up all the plastic from the roller surface since a resin foil of a thickness of one to two hundredth of one mm. remains on the latter, and hardens after a time on the roller surface, and further layers then adhere thereto. The diameter of the roller is thus increased after a time and in effect the spacing between the roller and the blade 4 becomes smaller.

The disadvantage can be overcome by the arrangement according to FIG. 2. A roller 5 which is heated by hot fluid in a conduit $5a$ which is rotatable in the same direction as roller 1 is caused to engage with the roller 1, and the carrier 2 is guided by the roller 5. In this case, the roller 5 completely removes all the plastic by its engagement with the roller 1 and transfers it to the carrier in a layer of reduced thickness, depending on the peripheral speed $c_5$. Also in this case, the carrier cannot completely take all the plastic off the roller 5, and some plastic remaining thereon. This plastic remainder, however, is fully taken up by the roller 1 at the point indicated at X and is conveyed thereby to the starting point, i.e. is returned to the plastic mass 3. The possibility of plastic particles being able to adhere to the roller surface and harden there is thus precluded.

With this arrangement, the stretching of the plastic layer produced on the roller and having a thickness of $v_1$ can also be carried out in two steps: it is first stretched to thickness $v_5$ and then, by the adjustment of the speed of the carrier to $v_2$ so that the final thickness in this case will be as follows:

$$v_2 = v_1 \frac{c_1}{c_5} \cdot \frac{c_5}{c_2} = v_1 \cdot \frac{c_1}{c_2}$$

The transfer of the plastic layer from the roller 5 to the carrier can be improved by engaging the carrier against the roller 5 over a longer arc and increasing its pressure against the roller. The pressure can be increased by a belt (or steel strip) 6 which can be tensioned and driven by a tensioning roller 8. The transfer of the plastic is still further improved if the carrier is heated, e.g. with the aid of a heating element 7 heated by a heating coil $7a$, so that its temperature exceeds that of the roller 5.

By using the pair of rollers 1, 5 it is possible strongly to reduce the viscosity of the plastic by heating it to a high temperature before it is applied to the carrier, and in this way the impregnation into the carrier is improved. The roller 1 is only heated to the softening temperature of the plastic or to a temperature at which the plastic can best be drawn to form a foil, e.g. in the case of resol resins to a temperature of 70–90° C. It is thus ensured that the plastic withstands the stretching occurring in the transfer from the roller 1 to the roller 5 with its higher peripheral speed, without tearing. The temperature of the roller 5 is so chosen that the plastic melts to a liquid of low viscosity, the excess of noxious vapours (free phenol, formaldehyde etc.) escape and the plastic then coming into contact with the carrier, penetrates into the interior thereof. The temperature of the roller 5 is adjusted in the case of coating of, for example, resol resins, to a temperature of about 120–160° C.

Figure 3:
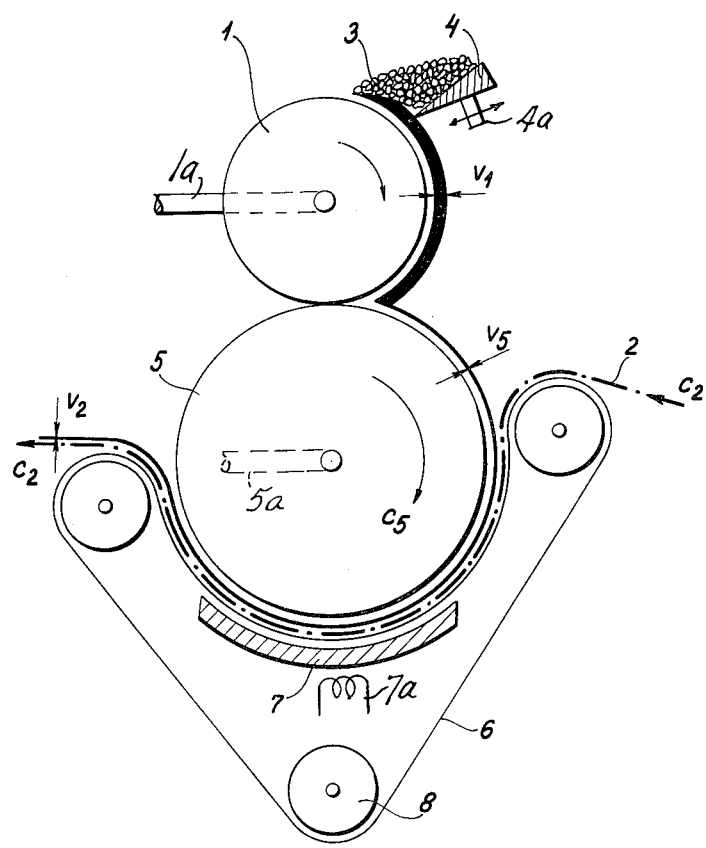
FIG. 3 shows another embodiment, in which the carrier moves in opposite direction to that in FIG. 2.

For impregnating, adequate time is also necessary, and this can be ensured in that the carrier, according to FIGURE 3, is brought into extended contact with the surface of the roller 5. In this arrangement, only the direction of movement of the carrier is changed. In this case, the speed $c_2$ can be assumed to be equal to the peripheral speed $c_5$ and the carrier is engaged against the roller 5 over a longer arc. The carrier will in this case absorb the plastic from the surface of the roller 5 and take it up. The impregnation can be improved by exerting a pressure upon the carrier which is already in engagement with the roller 5, by tensioning the belt 6, and/or by heating the carrier by means of the element 7 to a temperature which exceeds that of the plastic on the roller 5.

In the above-described arrangements, the edge of the blade 4 is the only surface to which the plastic can adhere and cause trouble, although only after a long time. In the case of the arrangement shown in FIG. 4 and obtained by a combination of FIGS. 2 and 3, even this disadvantage can be overcome. In this case, the plastic 3 is introduced into a feeding device. This consists of a pair of conveyor belts 9, 9' which continuously feed the plastic to the surface of the air of rollers 1, 1'. The drive of the conveyor belts is effected by means of a slipping clutch or any other device providing a constant pressure, due to the action of which the plastic located between the belts is pressed against the surface of the rollers, under a constant pressure.

The plastic melts on the pair of heated rollers 1, 1' the temperature of which is adjustable and is continuously conveyed by the rollers in a layer whose thickness corresponds to the gap $v_1$ set therebetween. Due to the opposite directions of rotation of the rollers, the plastic layer of a thickness $v_1$ will separate on the lower surfaces thereof at point A into two layers of a thickness of $v_{1x}$ and $v'_{1x}$ respectively. These individual layer thicknesses are variable but it is certain that the sum of the layers $v_{1x}$ and $v'_{1x}$ associated with the same separation points, is constant and equal to $v_1$.

From the roller 1, a plastic layer of thickness $v_{1x}$ is taken over by the roller 5, the temperature and peripheral speed of which are adjustable. Due to the difference of the peripheral speeds, the thickness $v_{1x}$ will upon transfer be $$v_{5x} = v_{1x} \frac{c_1}{c_5}$$

The roller 5 transfers the plastic layer to the resin carrier 2. The carrier to be coated is stored on a mandrel 15, and, after coating, is wound up on a storage mandrel 14, the drive of which ensures an adjustable value of the speed $c_2$ of the carrier. Corresponding to the speed $c_2$, there is formed on the carrier a plastic layer of the thickness $$v'_{2x} = v'_{5x} \cdot \frac{c'_5}{c_2} = v'_{1x} \cdot \frac{c_1}{c'_5} \cdot \frac{c_5}{c_2} = v'_{1x} \cdot \frac{c'_1}{c_2}$$

The carrier is thus temporarily coated by the roller 5 with a plastic layer of a variable thickness $v_{2x}$. Roller 1' transfers the plastic to roller 5', on which a layer of the thickness $$v'_{5x} = v'_{1x} \cdot \frac{c'_1}{c'_5}$$

is formed. The carrier then engages with the roller 5' and removes therefrom the plastic layer $$v'_{2x} = v'_{1x} \cdot \frac{c'_1}{c'_5} \cdot \frac{c'_5}{c_2} = v'_{1x} \cdot \frac{c'_1}{c_2}$$

so that on the surface, together with the above layer, plastic layer of the thickness $$v_2 = v_{2x} + v'_{2x} = \frac{c_1}{c_2}(v_{1x} + v'_{1x})$$

is now formed if $c'_1 = c_1$. Insofar as it is ensured that the values $v_{1x} + v'_{1x} = v_1$, there is thus produced on the carrier a layer of the thickness $$v_2 = \frac{c_1}{c_2} v_1$$

which is independent of the conditions occurring upon separation of the rollers 1, 1' and whose thickness is thus constant.

The correlation of the layers $v_{1x}$ and $v'_{1x}$ combining on the surface of the carrier can be ensured by arranging the roller 5' symmetrically with respect to the roller 5 so that the contact point $B^1$ will be further removed from the separation point A of the rollers 1, 1' than the point B. The arc A–B is thus shorter than the arc A–B'. By a suitable selection of the arc lengths, the feeding of the layer $v'_{1x}$ to the carrier can be delayed, thus providing that the associated values $v_{1x}$ and $v'_{1x}$ separating at point A, arrive at point C—located on the surface of roller 5'—at the same instant and, thus arriving at the same point of the carrier, are applied conjointly.

In order to enhance the transfer of the plastic layer, the carrier is pressed against the rollers 5 and 5' with the aid of the belts 6 and 6' (or steel strips), and heated to an adjustable temperature with the aid of the elements 7 and 7'. Prior to being wound up the carrier coated with plastic is guided through heating element 10, the adjustable temperature of which makes possible the heat treatment of the coated plastic layer as necessary in each case, according to requirements.

A similar device can also be provided for the heat treatment of the carrier leaving the roller 5 and coated on one side, whereby it is made possible that the plastic is fully absorbed in the interior of the carrier before contacting the roller 5'.

Figure 4:
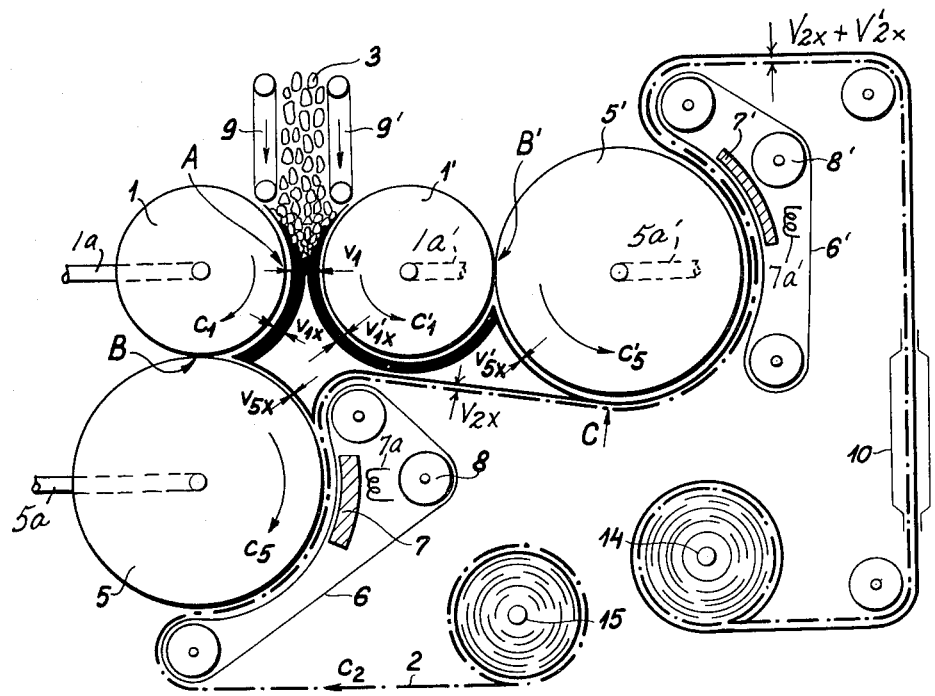
FIG. 4 shows another embodiment which in effect is a combination of FIGS. 2 and 3.

The following possibilities of adjustment are provided in the apparatus of FIG. 4:

(a) The temperatures of the rollers 1, 1', 5 and 5' as well as of the elements 7, 7' and 10 are adjustable.

(b) The peripheral speeds of the rollers 1, 1', 5 and 5' as well as the speeds of movement of the belts 6, 6' and of the carrier 2 are adjustable.

In the first case, the plastic layer $v_{2x}$ as well as the plastic layer $v'_{2x}$ are applied to the same side or same surface of the carrier, i.e. by first spreading on the layer $v_{2x}$ and then by impregnating it with the layer $v'_{2x}$.

Figure 5:
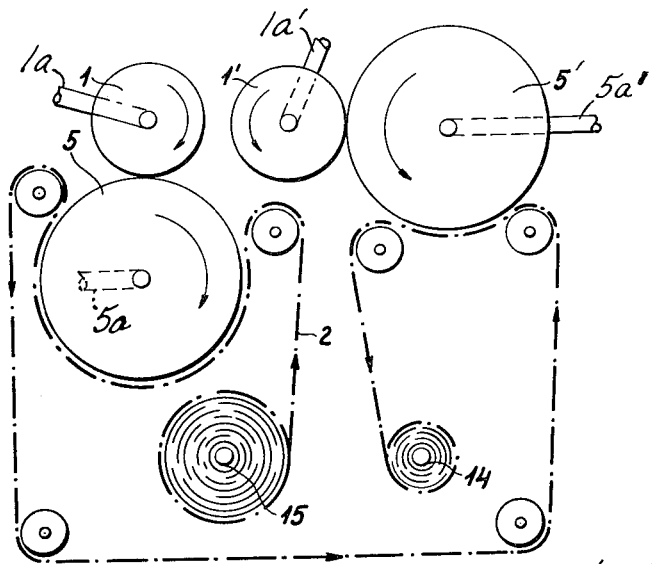
FIG. 5 shows still another embodiment, in which the guiding of the carrier is modified with respect to that of FIG. 4.

With the same arrangement of the rollers but by means of a modification of the guide means for the carrier, various coatings are possible. For example by guiding the carrier according to FIG. 5, one side of the carrier is first coated by impregnating it with the layer $v_{2x}$ and then by spreading thereon the layer $v'_{2x}$.

By guiding the carrier according to FIGS. 6 and 7, a coating on both sides is possible, i.e. according to FIG. 6 the coating can be effected on both sides by spreading and, according to FIG. 7, on both sides by impregnating.

The application of the plastic layer $v'_{1x}$ onto the carrier can be delayed, apart from the possibility of an asymmetrical arrangement, also by interposing auxiliary rollers 11' and 12' according to FIG. 8. These rollers are likewise heatable and their speed of rotation is adjustable. Depending on requirements, one or two such rollers can be incorporated. The time lag can be reduced if the shaft 15 of the storage roller of the carrier to be coated, as well as the winding roller 14 of the coated carrier are not mounted at the place shown in FIG. 7 and at right angles to the plane of the drawing, but outside the coating apparatus and parallel to the plane of the drawing, and the carrier is guided by means of guide rollers at 45° to the roller 5 and roller 5'.

In the apparatus according to FIG. 4, the rollers 1 and 1' can also be provided with blades as shown in FIGURES 1–3 and supplemented with one further reel each for receiving the carrier and the impregnated material. In this case, the apparatus according to FIG. 4 would be suitable for a simultaneous impregnation of two carriers on one side.

In place of the blade 4, especially when applying thermoplastic materials, a heatable roller can also be used, the direction of rotation of which is opposite to that of the roller 1 and spacing of which from the roller 1 is so adjustable that a gap of the thickness $v_1$ is correspondingly adjustable therebetween. By an adjustment of the temperature of the roller it is possible to provide that the plastic layer of thickness $v_1$ which is produced adheres to the surface of the roller 1.

In the apparatus according to FIGURES 2 and 3, the necessity exists of filtering the plastic lest it contain solid impurities. The rollers 1 can be used for filtering the plastic at the same time that it is applied, provided they are equipped with a filter device according to FIG. 9. By feeding the plastic onto the cooled plate 19, it comes into contact with the warm roller 1.

Having become soft, it passes, due to the rotation of the roller, through the narrow gap 21 into the chamber 20 which is bounded by the surfaces of the roller 1, filter 18 and a front member 17. Due to the rotation of the roller 1, the plastic cannot flow back through the gap 21 so that a pressure builds up in the chamber 20, whereby the melted plastic, flowing through the filter, arrives at the blade 4. The filter 18 is mounted on the heated prism-shaped member 16, the lower edge of which lies at a distance from the surface of the roller 1 smaller than the distance of the scraper blade from the same surface, said member being provided with bores 13 through which the plastic passes.

In the apparatus according to FIGURES 2–7, the carriers, if no pressure belts 6 and 6' are provided, can also be pressed against the surfaces of the rollers 5 and 5' by means of one or more pressure rollers. Rubber-coated or spring-actuated pressure rollers are ordinarily necessary with carriers which are not free of creases.

When impregnation is to be effected on both sides of carriers of a very loose structure and great absorptive capacity e.g. textiles, the apparatus shown in FIG. 10 can preferably be used. In such apparatus the impregnated carrier cannot soil the guide rollers of the apparatus since none are provided; in fact, the carrier 2 is guided from the coating roller 5 directly to the coating roller 5'.

What I claim is:

1. A process for the continuous coating of a carrier with plastic material, comprising feeding plastic continuously onto the surface of at least one heated rotating receiving roller to form a first layer of plastic on a part of said surface, transferring said layer continuously to the surface of at least one heated coating roller which is axially parallel to and in continuous contact with said receiving roller and which is rotating in the same direction as and at a higher peripheral speed than said receiving roller, the ratio of the peripheral speeds of said receiving and coating rollers being such that on part of the surface of said coating roller a continuous second layer of plastic is formed of a thickness less than that of said first mentioned layer, and transferring said second layer to a carrier moving in contact with a substantial proportion of the surface of said coating roller.

2. A process as claimed in claim 1 in which said plastic material is fed into the gap between two parallel rotating receiving rollers each in contact with a respective coating roller, the first layers produced on the respective receiving rollers being transferred to the respective coating rollers as said second layers, and thereafter transferred to a carrier moving in contact with both coating rollers in succession.

3. A process as claimed in claim 2 in which both said second layers are coated onto one side of said carrier.

4. A process as claimed in claim 3 in which the two said second layers are applied by coating to opposite sides of said carrier.

5. Apparatus for coating a carrier with plastic material comprising an adjustable heatable rotatably mounted receiving roller means and coating roller means, said roller means being axially parallel and having continuous cylindrical peripheries in continuous contact with each other and being mounted for rotation in the same direction with said receiving roller means rotating at a substantially slower peripheral speed than said coating roller means, layer forming means adjacent said receiving roller means to determine the thickness of a first layer formed on the surface thereof during operation, and means for moving a carrier past and in contact with a substantial proportion of the periphery of said coating roller means to receive a plastic layer thereon.

6. Apparatus as claimed in claim 5 wherein said receiving roller mean and said coating roller means comprises two sets of receiving and coating rollers respectively in contact with each other, the receiving rollers being spaced a short distance apart, and means for feeding plastic material between said receiving rollers.

7. Apparatus as claimed in claim 5 including means for pressing a carrier against said coating roller means.

8. Apparatus as claimed in claim 5, wherein said receiving roller means and said coating roller means comprise two sets of receiving and coating rollers respectively in contact with each other, said two coating rollers being in close proximity to each other so as to permit the carrier in operation to pass directly from the surface of one to the surface of the other coating roller thereby to permit coating of the carrier on both sides.

9. Apparatus as claimed in claim 6 including a plastic filter disposed between the point of application of plastic to the receiving roller and the layer forming means, the edge of said filter being disposed closer to the surface of said receiving roller than said layer forming means.

References Cited by the Examiner

UNITED STATES PATENTS

| | | | |
|---|---|---|---|
| 1,306,649 | 6/1919 | Weinheim | 118—202 X |
| 1,402,288 | 1/1922 | Fisher | 117—111 |
| 2,157,286 | 5/1939 | Emmey | 118—202 |
| 2,198,630 | 4/1940 | McManus | 117—111 |
| 2,213,117 | 8/1940 | Blackmore | 118—259 X |
| 2,291,616 | 8/1942 | Fletcher | 117—68 |
| 2,555,536 | 6/1951 | Faeber | 118—262 |
| 2,631,643 | 3/1953 | Schueler | 118—262 |
| 2,631,946 | 3/1953 | Schueler | 117—68 X |
| 2,728,939 | 1/1956 | Behr | 18—9 |
| 2,861,008 | 11/1958 | Hollmann | 117—111 X |
| 2,926,100 | 2/1960 | Weigle et al. | 117—111 X |
| 3,023,128 | 2/1962 | Affelder | 117—111 |
| 3,067,718 | 12/1962 | Kraft | 118—257 X |
| 3,110,612 | 11/1963 | Gottwald et al. | 117—64 |

FOREIGN PATENTS 416,960   9/1934   Great Britain.

JOSEPH B. SPENCER, *Primary Examiner.*

RICHARD D. NEVIUS, *Examiner.*